United States Patent [19]

Poppe et al.

[11] 3,735,410

[45] May 22, 1973

[54] DIRECTION FINDER GAIN CALIBRATION UPDATING SYSTEM

[75] Inventors: Dag Poppe, 1346 Gjettum; Odd Mathiesen, Oslo 5, both of Norway

[73] Assignee: International Standard Electric Corporation, New York, N.Y.

[22] Filed: Dec. 27, 1971

[21] Appl. No.: 212,531

[52] U.S. Cl. ....................343/114

[51] Int. Cl. ....................G01s 3/10

[58] Field of Search ....................343/114, 114.5

[56] References Cited

UNITED STATES PATENTS

| | | | |
|---|---|---|---|
| 1,920,159 | 7/1933 | Antranikian | 343/114 |
| 2,454,768 | 11/1948 | Burroughs | 343/114 |

*Primary Examiner*—Benjamin A. Borchelt
*Assistant Examiner*—Denis H. McCabe
*Attorney*—C. Cornell Remsen et al.

[57] ABSTRACT

A calibration (updating) system for dual channel direction finders having two receiver channels associated with a corresponding pair of loop antennas. A cathode ray tube having orthogonal deflection elements is connected to present the two receiver channel outputs as an index line at the bearing angle. Means are included for calibrating the gain and phase characteristics of the channels automatically. A signal evaluation circuit employing self-adjusting feedback arrangement automatically injects a bearing offset during the gain and phase calibration (updating) process to correct for quadrantal errors.

6 Claims, 14 Drawing Figures

DIRECTION FINDER GAIN CALIBRATION UPDATING SYSTEM

BACKGROUND OF THE INVENTION

1. Field of the Invention

The invention relates generally to radio direction finding equipment and more particularly, to refinements in the method of applying quadrantal error corrections.

2. Description of the Prior Art

In the prior art, the radio direction finder is a well known device. The particular type of direction finder to which the present invention is primarily directed is described (including the nature and need for quadrantal corrections) in several well known texts. Among these are "Radio Engineers' Handbook" by Fredrick E, Terman (1943) and "Electronic Avigation Engineering" by Peter C. Sandretto (1958). Pages 872 of the Terman text and pages 55–56 of the Sandretto text are of particular interest.

Accordingly, in dual channel direction finders of the described prior art type, it has been common practice for many years to calibrate the device by updating or adjusting the gain of the amplifiers of the two receiver channels to equality before bearings are taken. When the outputs from these two amplifiers are applied to individual plate pairs of a cathode ray tube for monitoring the adjustment, the gain of one of the amplifiers may simply be increased or decreased until a line appears at 45° on the CRT. This process is described in the aforementioned Terman reference. Furthermore, it is desirable and well known to compensate for the so-called quadrantal error, the latter being described in the Terman reference and also in the Sandretto reference.

SUMMARY OF THE INVENTION

In existing prior art systems there will often be uncertainty regarding the accuracy of the quadrantal error correction, and the general object of the present invention may be said to be provision of a two-channel direction finder in which this uncertainty is eliminated by improved automatic circuitry for applying appropriate corrections.

An important feature of the present invention is that during updating, the output signals from the two amplifiers are compared in a signal evaluation circuit so as to produce a control signal in response to said comparison of said output signals differ by an amount corresponding to the desired quadrantal error correction.

By this arrangement, the previous uncertainties regarding compensation for quadrantal error are eliminated or greatly reduced. The signals present during the updating periods may be displayed on the CRT, so as to provide a check of the updating including the quadrantal error.

For a given frequency and a given ship with a given rigging the quadrantal error is determined during installation of the direciton finder, and in accordance with the operation of the invention, the quadrantal error will appear on the cathode ray tube in addition to the 45° display resulting from the aforementioned channel gain calibration.

In a preferred embodiment of the invention, the quadrantal error is preset in a digital code unit. Drift in analog attenuators and amplifiers causing bearing errors are thereby eliminated. In such a digital code unit the quadrantal error is always set exactly and is independent of temperature, humidity and other variable conditions. Compatible instrumentation for the direction finder circuitry is included.

Above mentioned and other features and objects of the present invention will be understood from the following detailed description of embodiments of the invention, taken in conjunction with the drawings.

DESCRIPTION OF THE PREFERRED EMBODIMENTS

Figure 1:
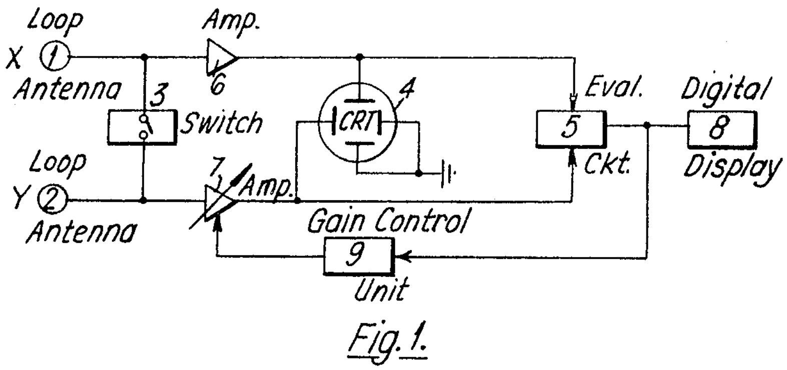
FIG. 1 illustrates, in block diagram form, the updating (calibration) system according to the present invention.

In FIG. 1 is schematically shown a block diagram of a typical direction finder instrumented according to the present invention.

Signals Y and X are detected by two orthogonal loop antennas 1 and 2 and passed via receiver channels including tuned amplifiers 6 and 7, respectively. These signals will hereinafter be called Y and X through the respective receiver channels and as displayed on a cathode ray tube (CRT) 4 and compared in signal evaluation circuit 5.

When bearings are taken, bearing value (including quadrantal error correction) is displayed on the CRT 4 and also on a digital display 8. The circuitry is updated (calibrate) at regular intervals and the updating process is in accordance with correction signals from a gain control unit 9 which includes compensation for quadrantal error. A sequence control unit (not a part of the present invention) would normally be provided for controlling the various units during periodic updating and during taking of bearings. The first event during an updating period is operation of switch 3 for effecting interconnecting of the inputs to the amplifiers 6 and 7.

During updating the utput signals from the two amplifiers 6 and 7 are compared in the signal evaluation circuit 5 so as to produce a control signal in response to said comparison for controlling the gain of the adjustable amplifier 7 until the amplitude of said output signals differ by an amount corresponding to the desired quadrantal error correction.

By opening the switch 3 and undertaking other control functions, the equipment (after an updating period) is switched to its bearing condition the gain control unit 9 continues to hold the gain of the amplifier 7 in accordance with the last updated value. The quadrantal error correction is now incorporated in the signal loops, so that correct bearing values will be displayed on the CRT 4. The correct bearing will also be displayed on the digital display unit 8.

Figure 2:
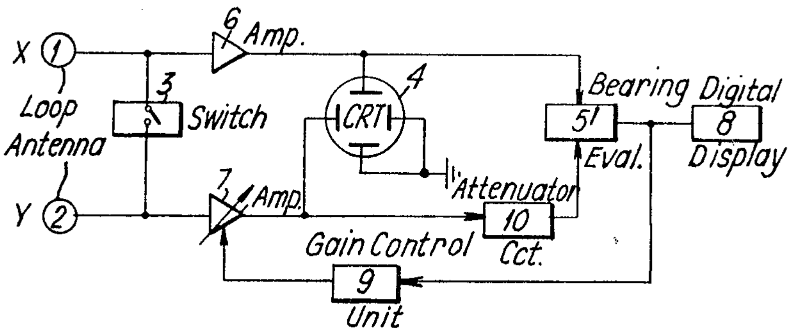
FIGS. 2 and 2*a* show a first embodiment of the arrangement for quadrantal error application to the system.

In FIG. 2 is shown in more detail an embodiment of the invention where an attenuation circuit 10 is included in the lead from the output of the adjustable amplifier 7 to a signal evaluation circuit, now called the bearing evaluator 5'. The other components and units are identical or similar to the components and units shown in FIG. 1. The attenuation circuit 10 is controlled by a main sequence control (not shown) to be active during updating periods, and its attenuation is then preset in accordance with the desired quadrantal error correction. The gain control unit 9 controls the amplifier 7 so as to automatically compensate for the attenuation introduced by the circuit 10. The signals presented to the bearing evaluator 5' will therefore, in the embodiment of the invention, be equal in amplitude (although the internal amplifier gains are not then equal), making digital comparison quite simple. Details of the bearing evaluator 5' and the gain control unit 9 will be described in connection with other embodiments of the invention. The digital display unit 8 may, during updating periods, be controlled so as to dispaly the frequency of the signals to which the two amplifiers (receivers) are tuned (i.e., when bearing determinations are not being made).

Figure 2A:
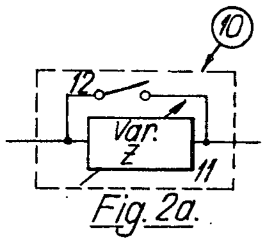

In FIG. 2*a* is shown a simple embodiment of the attenuation circuit 10 of FIG. 2. This ciruit may be represented diagramatically by a variable impedance 11, since its value is variable in that it is preset to the desired quadrantal error correction. This value usually varies with frequency and the attenuation circuit therefore is controlled to preset different values in accordance with the tuned-in frequency. A switch 12 is shown for indicating that the attenuation circuit is short circuited when bearing readings are being made.

Figure 3:
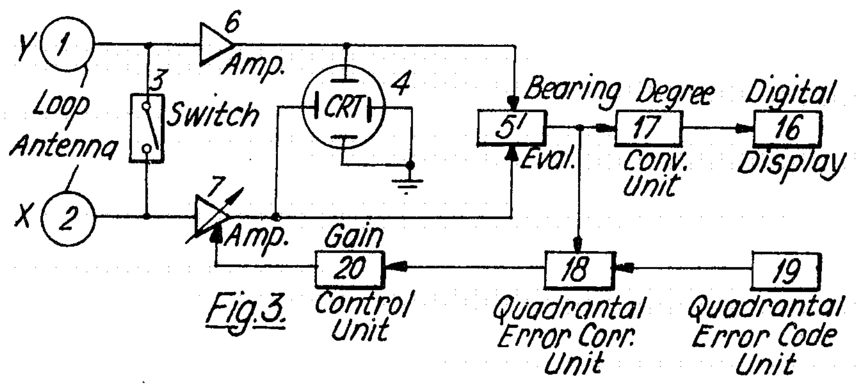
FIG. 3 schematically shows a second embodiment for the same purpose as that of FIG. 2.

In FIG. 3 is schematically shown a second embodiment of the invention with more details of the quadrantal error and gain control feedback loop. The sequential control is now shown. Blocks identical with blocks shown in FIGS. 1 (and 2) are given the same reference numerals.

The two signals X and Y are applied to the oppositely arranged pair of plates of the cathode ray tube 4 and a line of 45° will appear on the tube screen when the two signals have equal amplitude. In the bearing evaluator 5', the two signals are compared and there is generated a pulse signal, the duty cycle of which is 25 percent when the two signals have equal amplitude. The output signal from the bearing evaluator 5' is applied to a digital display unit 16 via a degree conversion unit 17. The output signal from the bearing evalurator 5' is also applied to a quadrantal error correction unit 18, which is set up by a quadrantal error code unit 19. The ouptut signal from the quadrantal error correction unit 18, which is a pulse signal with corrected duty cycle is applied to a gain control unit 20 (corresponding to the gain control unit 9 in FIG. 2), which again controls the gain of the amplifier 7.

Drift in analog attenuators and amplifiers causing bearing errors are eliminated by these exact digital settings. The previous analog scale for setting the QE is replaced by digital coding.

As mentioned, one object of the present invention is to control the amplifier 7, such that the quadrantal error is taken into account during updating. This is effected by means of the loop comprising the bearing evaluator 5', the quadrantal error correction unit 18, the gain control unit 20 and the amplifier 7. This loop operates in the following manner: Assume to start with that the gain of both amplifiers are equal so that the output from the bearing evaluator 5' is a pulse or gate signal with duty cycle equal to 25 percent. The length of the positive pulse therefore corresponds to 45° on the CRT 4. For further convenience in explanation of the circuit, it is assumed that the quadrantal error code unit 19 is preset to 1°. The quadrantal error correction unit 18 reacts on the given information by cutting out one forty-fifth part corresponding to 1° of the positive pulse appearing on its input. On the output of this unit 18, there will thus appear a pulse signal havign a positive pulse corresponding to 44°. When this signal is presented to the gain control unit 20, that unit reacts by comparing this signal with the equivalent of a 25 percent duty cycle signal, an ineqality resulting since its input signal is now only corresponding to 44°. Unit 20 therefore controls the gain of the amplifier 7 such that its amplification is changed in such a way that the output of the bearing evaluator 5' corresponds to 46°. When this new pulse signal representing 46° is presented to the quadrantal error correction unit 18, this unit still receives information from the quadrantal error code unit 19 for cutting out a part of the positive pulse corresponding to 1°. On the output of the quadrantal error correction unit 18 there will now appear a positive pulse having a length corresponding to $46° - 1° = 45°$. When the gain control unit 20 receives this new signal which now corresponds to a pulse signal with 25 percent duty cycle, it stops further adjustment of the gain of the amplifier 7. The operation of this circuit which is not unlike a pulse servo circuit, will be explained in more detail in connection with description of FIGS. 4, 5 and 6. If the gain of the amplifier 7 or the components and circuitry leading to the switch 3 should vary extraneously, such variation or altered gain will be detected by the bearing evaluator 5', whereby the gain of the amplifier 7 will be controlled correspondingly back into the aforementioned condition of equilibrium.

Figures 4, 4A:
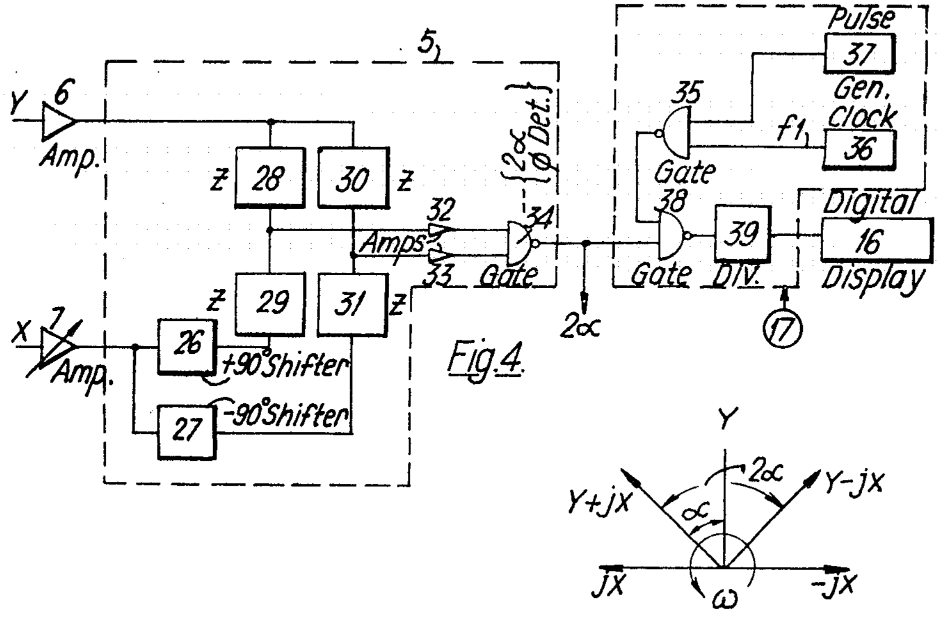
FIG. 4 shows a more detailed schematic of the bearing evaluator portion of the device.
FIGS. 4*a* and 4*b* show vector diagram and waveforms for FIG. 4.

In FIG. 4 is shown a block schematic of the bearing evaluator 5' of FIGS. 2 and 3, with the degree conversion unit 17 and digital display unit 16 also shown.

The signal in the X-channel is shifted + 90° in a phase shifting unit 26 and −90° in a phase shifting unit 27. The subsequent addition in the impedance (Z) networks 28, 29 and 30, 31 is shown in the vector diagram, FIG. $*A*. Those vectors rotate with a frequency $\omega$ so that the $y-jx$ signal lags the $y+jx$ signal by an angle 2 $\alpha$. When the amplitude of the two signals are equal, the angle $\alpha = 45°$.

Figure 4B:
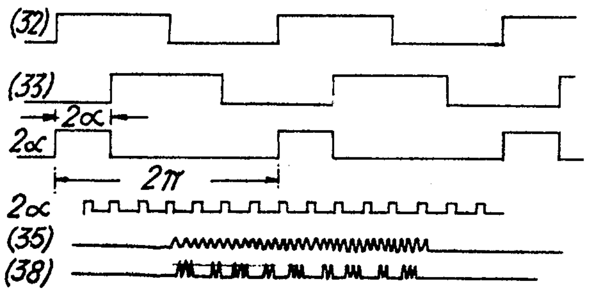

The signals $y+jx$ and $y-jx$ are passed through amplifiers 32 and 33, respectively, where they are amplified and clipped (limited) such that their zero-crossings are maintained accurately, (i.e., their rates of change are increased near zero). The resulting signals are indicated by curved (32) and (33), respectively, in FIG. 4*b*. The positive zero-crossing of $y+jx$ opens a gate 34 and succeeding positive zero-crossing of $y-jx$ closes the gate. Expressed in radius the gate 34 is held open an interval 2 $\alpha$, the length of one complete period being 2

π. The bearing angle $\alpha$ will therefore be seen to be directly presented as one half of the phase displacement between the signals $x+jy$ and $x-jy$. When $x$ and $y$ are equal, $\alpha = 45°$, $2\alpha = 90°$ ($\pi/2$) and the duty cycle of the clopped square wave signal from the gate 34 is 25 percent. The signal appearing at the output of the gate 34 (hereafter called the 2 $\alpha$-detector) is identical with the signal at the output of the bearing evaluator 5' of FIGS. 2 and 3.

The digital display, although not a necessary part of the combination of the present invention per se, is, nevertheless, described briefly. To the input of a gate 35 there is applied a clock pulse signal *fl* from a clock pulse generator 36 and a gate signal corresponding, for instance, to 0.1 seconds, from a pulse generator 37. The output signal from the gate 35, contains the total number clock pulses *fl* appearing during the gate pulse and is gated by the output from the 2 $\alpha$-detector 34, in a gate 38. (See FIG. 4*b*)

The 2 $\alpha$-detector 34 permits a fraction $2\alpha°/360°$ to pass gate 38 and thus the total number of pulses from 38 is in direct proportion to $\alpha$ (or 2 $\alpha$, as it may be). Assuming the signal frequencies of X and Y (and the 2 $\alpha$-signal) to be approximately 20 kHz, the evaluation period 0.1 sec (generator 37) and the clock frequency 10.8 MHz; the number of bursts for one evaluation period will then be 2,000. The total number of clock pulses to gate 38 will be 1,080,000 and the total number of pulses passing gate 38 will be 270,000 when $2\alpha = 90°$. As previously mentioned, this corresponds to a line appearing at 45° on the CRT. In order to obtain the numbers 4-5-0 on the digital display 16, the signal is passed through a division circuit 39 in which it is divided by $6 \times 10^2$. On the digital display 16 there is arranged a decimal point betweeen the tenths and the units, so that the number appearing will be degress and tenths of degrees; in this case 45.0°.

Figure 5:
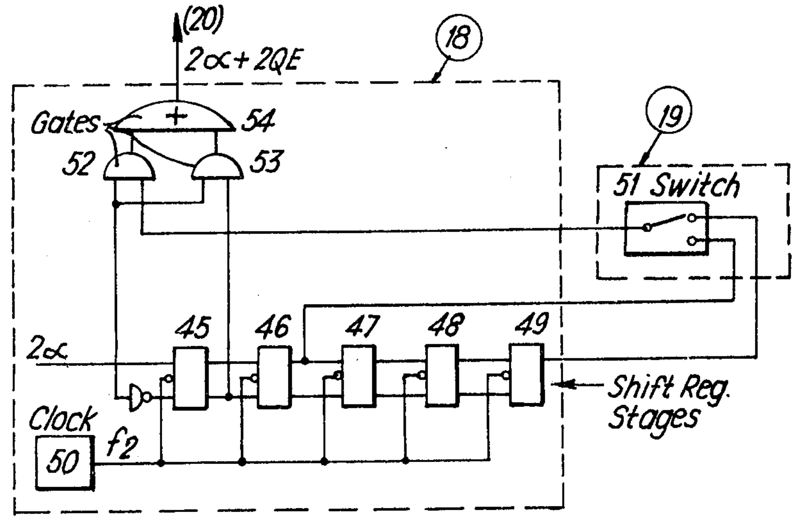
FIG. 5 schematically shows the quadrantal error correction unit of FIG. 3.
Figure 5A:
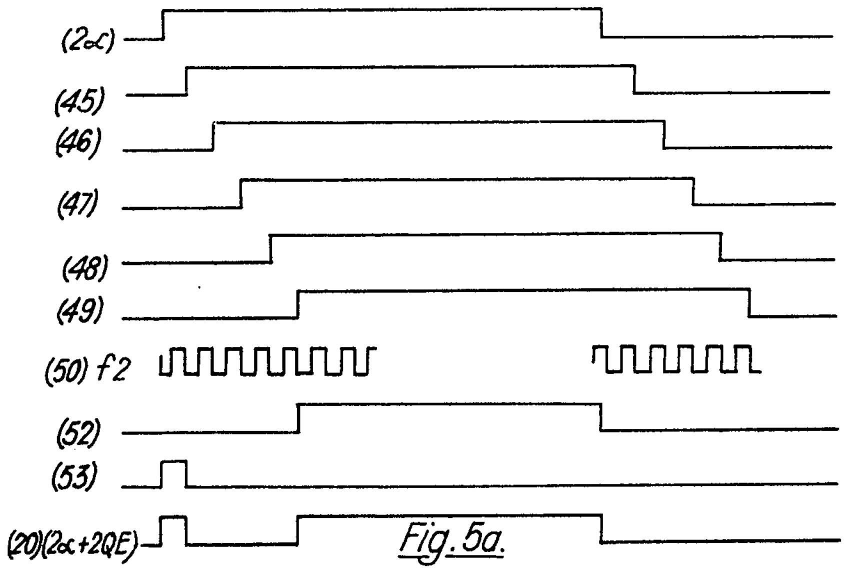
FIG. 5*a* shows a waveform diagram for FIG. 5.

In FIG. 5 is shown the detailed schematic of the quadrantal error correction unit 18 of FIG. 3. The 2 $\alpha$- signal is applied to a shift register having a number of stages 45, 46, 47, 48 and 49. The shift register is triggered by a clock frequency *f2* from a clock pulse generator 50 and shown in the waveform diagram, FIG. 5*a*. The 2 $\alpha$-signal which has a frequency of approximately 20 kHz corresponding to the IF of the signal appearing at the antenna and is not synchronized with the clock frequency *f2*, so that the output of the first stage 45 of the shift register will be phase shifted by an amount less than one period of the clock frequency, while the output of the ther stages on the shift register will be exactly phase shifted by one period of the clock frequency. Preselected outputs from the stages of the shift register are applied to the quadrantal error code unit 19 which is also shown in FIG. 5, so that desired outputs may be selected by a switch 51 and applied to a gating arrangement 52, 53 and 54. To the gate 52 is applied the 2 $\alpha$-signal as well as the quadrantal error pulse signal from the unit 19. On the output of this gate will therefore appear a signal (52) shown in FIG. 5*a*. In addition to this pulse appearing on the utput of gate 52, there will appear from gate 53, a pulse corresponding to the difference in time between the positive-going edge of the 2 $\alpha$-pulse and the positive-goind edge of the clock signal appearing thereafter. The outputs from the gates 52 and 53 are added in a gate 54 to produce a corrected 2 $\alpha$-signal, called ($2\alpha+2QE$). The cutoff part corresponds to the pre-determined number of periods of the clock frequency selected by the quadrantal error code unit 19.

Figure 6:
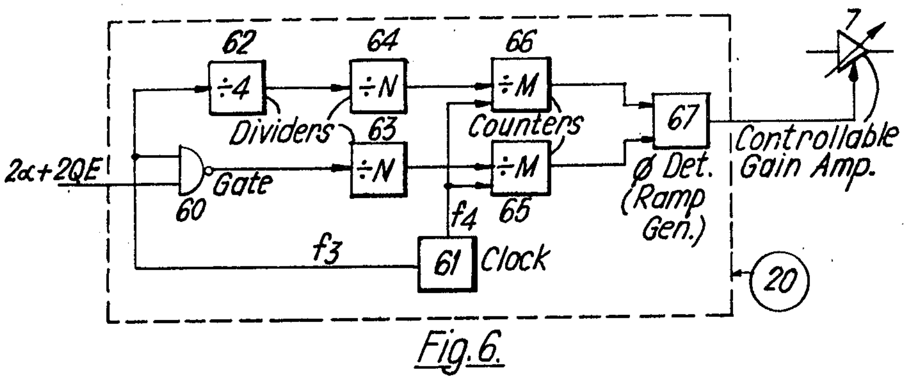
FIG. 6 schematically shows the gain control unit of FIG. 3.

In FIG. 6 is shown the gain control circuit 20 of FIG. 3. The 2 $\alpha$-signal including quadrantal error ($2\alpha+2QE$) appearing on the output of the quadrantal error correction unit 18 is applied to a gate 60. To the input of this gate is also applied clock pulses f3 from the clock pulse generator 61. At the output of the gate 60 there will appear bursts of clock pulses and when the duty cycle of the 2 $\alpha$-signal on the input is 25 percent, the number of output clock pulses will correspond to a division by 4 over an averaging period.

Figure 6A:
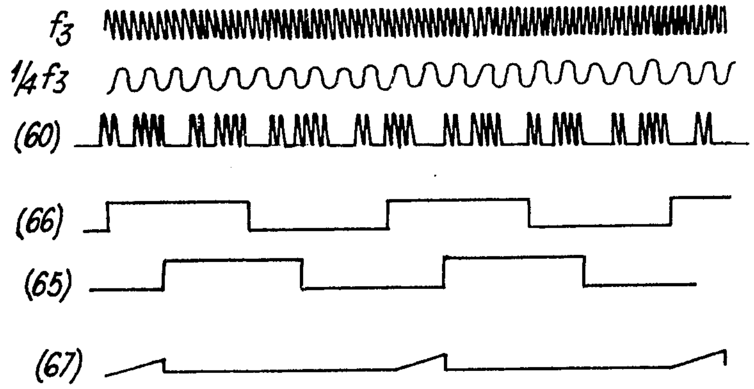
FIG. 6*a* shows a waveform diagram for FIG. 6.

The clock pulses are also applied to a division circuit 62 which divides the pulse rate by 4. Over an average time, corresponding to a number of periods of the 2 $\alpha$-signal, the number of clock pulses appearing at the output of the gate 60 and at the output of the division circuit 62 will be equal. These two pulse trains are further divided by a number N in division circuits 63 and 64, respectively. The outputs of these division circuits are applied to two counters 65 and 66 respectively and will cause phase shifts in these counters. These counters are primarily triggered by clock pulses f4 from the clock pulse generator 61, so that at the ouptut of these counters there will appear pulse trains of equal frequency, but with arbitrary phase. This is indicated in FIG. 6*a*. When the duty cycle of the 2 $\alpha$-signal appearing at the input of the gate 60 is 25 percent, the signal applied to the counter 65 and 66 from the division circuits 63 and 64 respectively have the same repetition frequency, so that these pulse signals will cause identical phase shift o the two output signals from the counter 65 and 66. These two output signals are applied to a phase detector or ramp generator 67. This ramp generator is triggered on by the positive edge of one of the signals and triggered off by the positive edge of the other signal. The output signal from the phase detector 67 is therefore an analog signal which may be used for controlling the gain of the amplifier 7. As long as the duty cycle of the 2 $\alpha$-signal appearing on the output of the quadrantal error correction unit 18 and applied to the gate 60 is 25 percent, the gain control signal appearing on the utput of the phase detector 67 will have the same constant value. It was mentioned, however, that initially, the relative phase between the utputs from the counters 65 and 66 is arbitrary. This will result in an output signal from the phase detector 67 which will not give the amplifier 7 correct gain control. When the gain control of the amplifier 7 is not correct, this will result in a 2 $\alpha$-signal with duty differing from 25 percent. As a result of this incorrect 2 $\alpha$-singal the division circuit 63 will apply a number of trigger pulses to the counter 65, which is different from the number of pulses applied to the counter 66 by the division circuit 64. Correspondingly the number of pulses applied to the counter 65 will be less than the number of pulses applied to the counter 66, when the duty cycle of the 2 $\alpha$-signal is less than 25 percent. In this way the phase of the output signal from the counter 65 will be shifted until it reaches the desired value.

It will be seen from the above that when the gain of the amplifier 7 is controlled such that the quadrantal error is included, the feedback loop comprising the bearing evaluator 5', the quadrantal error correction unit 18 and the gain control unit 20 will ensure that this condition is continuously correct or correct at certain controlled intervals.

Figure 7:
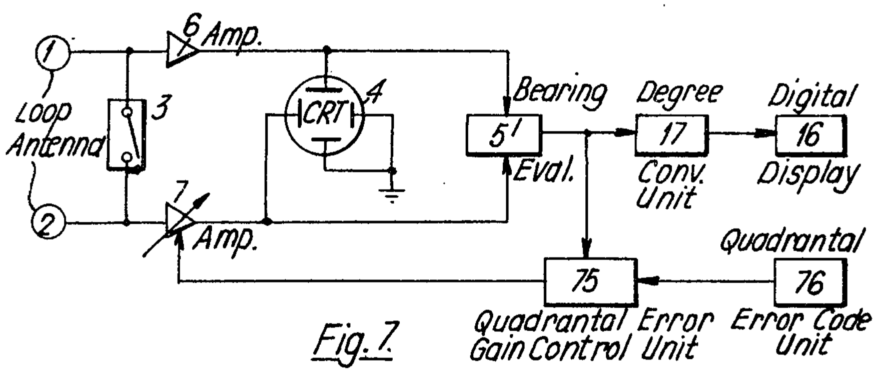
FIG. 7 shows a third embodiment of the updating system of the invention.

In FIG. 7 is shown an alternative embodiment of the invention. Units and blocks identical with units and blocks in FIG. 3 are indicated by the same reference numerals. It will be seen that the only different between the two circuits is that the quadrantal error correction unit 18 and the gain control unit 20 of FIG. 3 are combined in one unit called quadrantal error gain control unit 75. This unit is controlled by a quadrantal error code unit 76 which is somewhat different from the corresponding block 19 in FIG. 3.

Figure 8:
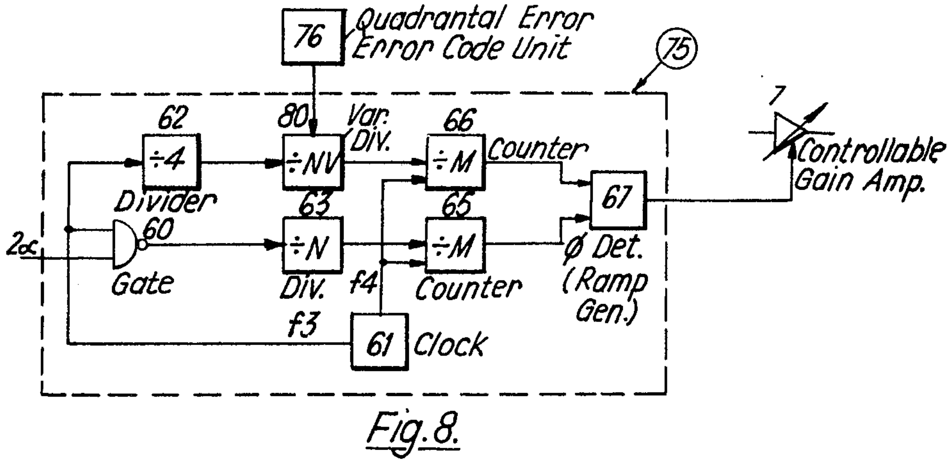
FIGS. 8 and 9 show details of portions of FIG. 7.

In FIG. 8 is schematically shown a block diagram of the quadrantal error gain control unit 75 of FIG. 7. The circuit is not generically different from the circuit of the gain control unit 20 shown in FIG. 6 and most of the blocks are identical. The difference between these two circuits is primarily that the division circuit 64 in FIG. 6 is replaced by a variable division circuit 80, the division number of which is controlled by the quadrantal error code unit 76 of FIG. 7. When there is no quadrantal error requiring correction, the division number of the division circuit 80 is identical with the division number of the division circuit 63. However, when the code unit 76 is set to a desired value, the division number will be reduced so that the circuit 80 is reset at a higher frequency than the division circuit 63. Assuming that the two signals having the amplifiers 6 and 7 to begin with are equal in amplitude, resulting in an output signal, the so-called 2 $\alpha$-signal, from the bearing evaluator 5' having a 25 percent duty cycle, and that the phase shift between the utputs of the two division circuits 65 and 66 has been tabilized via the feed back loop including the ramp generator 67 which controls the gain of the amplifier 7, the operation of the division circuit 80 will now be explained. When the division circuit 80 is set by the code unit 76 to a lower number than the division circuit 63, the number of pulses reaching the division circuit 65 differs from those reaching 66. The phase shift of the utput signals from these two division circuits will therefore be changed and this change in phase shift will be detected by the phase detector or ramp generator 56. The gain of the amplifier 7 will thus be controlled such that the duty cycle of the 2 $\alpha$-signal appearing at the output of the bearing evaluator 5' will be larger than 25 percent. This again will result in a higher number of clock pulses passing through the gate 60 and the circuit will only stabilize itself after the number of pulses leaving the two division circuits 80 and 63 are equal over a certain averaging time period, corresponding to the period of the 2 $\alpha$-signal, at least.

Figure 9:
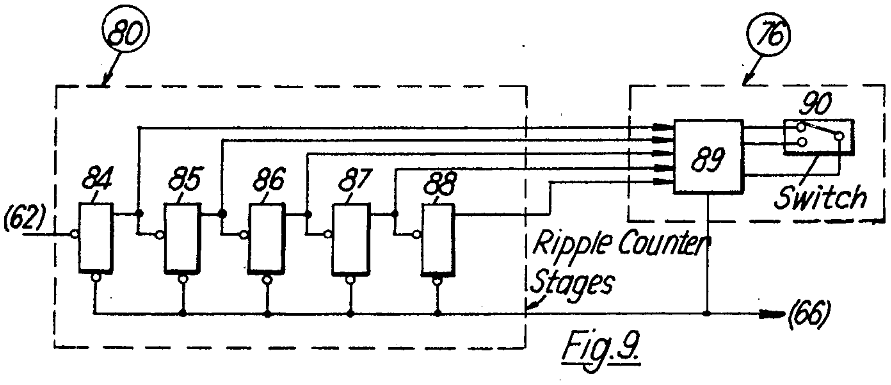

In FIG. 9 is schematically sown the division circuit 80 and the code unit 76. The division circuit 80 comprises a number of ripple counter stages 84, 85, 86, 87 and 88. The output signa from the division circuit 62 is applied to the first stage 84 of the counter. The utputs from the various stages of the counter are applied to a gating circuit 89 which is set up by a switching circuit 90. The counting circuit may then be reset at a number preselected by the code unit 76. When the counter 80 is reset an output signal will appear on the output of the gating circuit 89. This output signal is applied to the division circuit 66 shown in FIG. 8. Instead of varying the counter 80, the counter 63, or both of these counters, could, of course, be varied.

It should be emphasized that the above detailed description of an embodiment of the invention is not to be considered as a limiation of the scope of the invention. Various modifications falling within the spirit of the invention will suggest themselves to those skilled in this art. For just one example of such a modification, it may be practical to interconnect both amplifiers to the sense antenna of the system instead of simply interconnecting the two loop antennas.

What is claimed is:

1. In a dual receiving channel radio direction finder having corresponding dual direction sensitive antennas substantially orthogonally oriented whereby said receiving channels provide X and Y components for presentation of a bearing display, the combination comprising:

means including an element within one of said receiving channels for controlling said on channel gain, said element being responsive to a gain control signal;

a signal valuation circuit responsive to the output X and Y signal components from said receiving channels for developing said gain control signal as a function of the variation from a predetermined relationship between said X and Y components, thereby forming a feedback control loop; and means associated with said feedback loop for introducing a predetermined offset in the value of said feedback in said one channel, said offset being a function of the quadrantal error-correction required at a predetermined time.

2. Apparatus according to claim 1 in which said means for introducing a predetermined offset comprises an attenautor between said output of said one channel and said signal evaluation circuit, whereby said predetermined relationship between said X and Y components at the input of said signal evaluation circuit is met when said X and Y components of said receiver channels include an implicit offset corresponding to said quadrantal error correction; and including cathode ray tube display means, the two orthogonal deflection means of which are connected to said X and Y compon nts from said receiver channels, thereby to display bearing values; including a quadrantal correction, as a radial line on the face of said display means.

3. Apparats according to claim 1 including a digital code unit for providing quadrantal error corrections in digital code form according to a predetermined program, in which means are included for generating a periodic wave signal having a duty cycle which is a function of the amplitude difference between said X and Y component signals from said receiver channels, and in which means are included for modifying said duty cycle in accordance with said digital code.

4. Apparatus according to claim 3 in hich means are included for detecting the modified duty cycle of said periodic wave and for developing said gain control signal accordingly.

5. Apparatus according to claim 4 in which said periodic wave is substantially square wave produced by amplification and limiting whereby relatively large voltage versus time gradients are achieved at the leading and trailing edges thereof.

6. Apparatus according to claim 5 including a first digital counter and means for modifying the reset value of said first counter in accordance with said digital code, a second counter storing a number of digits according to the duration of said square wave, nd detector means responsive to said first and second counters for devloping said gain control signal as a function of the difference in the number of digits recorded by said counters at any time.

* * * * *